United States Patent [19]

Swedo et al.

[11] Patent Number: 4,511,492

[45] Date of Patent: Apr. 16, 1985

[54] ELECTRICALLY CONDUCTING AROMATIC AZOPOLYMERS AND METHOD OF PREPARATION

[75] Inventors: Raymond J. Swedo, Mount Prospect; David W. House, Arlington Heights, both of Ill.

[73] Assignee: UOP Inc., Des Plaines, Ill.

[21] Appl. No.: 543,655

[22] Filed: Oct. 19, 1983

[51] Int. Cl.$^3$ .............................................. H01B 1/06
[52] U.S. Cl. .................... 252/500; 252/510; 252/514; 252/518; 528/422
[58] Field of Search ............. 252/500, 510, 514, 518; 528/422

[56] References Cited

U.S. PATENT DOCUMENTS

| | | | |
|---|---|---|---|
| 3,198,767 | 8/1965 | Matsuda et al. | 252/500 |
| 3,598,768 | 8/1971 | Bach | 252/500 |
| 3,862,094 | 1/1975 | Shinohara et al. | 252/500 |
| 3,966,987 | 6/1976 | Suzuki et al. | 252/500 |
| 4,052,209 | 10/1977 | Huffman et al. | 252/500 |
| 4,222,901 | 9/1980 | Sinkovitz | 252/500 |
| 4,222,903 | 9/1980 | Heeger et al. | 252/500 |
| 4,306,996 | 12/1981 | Windhager | 252/500 |
| 4,359,411 | 11/1982 | Kim et al. | 252/500 |
| 4,401,590 | 8/1983 | Yoshimura et al. | 252/500 |

OTHER PUBLICATIONS

I. L. Katlyarevski et al., *Chem. Abst.* 62, 6571f (1964).
H. C. Bach & W. B. Black, *J. Polym. Sci.*, Part C, 22, 799 (1969).
S. M. Mehta & M. V. Vakilwala, *J. Am. Chem. Sci.*, 74, 563 (1952).
P. Santurri et al., *Org. Syn. Coll. vol. V*, 341 (1973).

*Primary Examiner*—Lester L. Lee
*Attorney, Agent, or Firm*—James R. Hoatson, Jr.; Eugene I. Snyder; William H. Page, II

[57] ABSTRACT

Aromatic azopolymers can be prepared in generally high yield by oxidatively coupling aromatic diamines using perborate salts. Glacial acetic acid is an effective solvent, and the presence or boric acid in the reaction medium sometimes improves product yield. Polymer yields over 70% generally are observed.

14 Claims, No Drawings

ELECTRICALLY CONDUCTING AROMATIC AZOPOLYMERS AND METHOD OF PREPARATION

BACKGROUND OF THE INVENTION

Although organic polymers have replaced metals in many structural contexts, thus far they have failed to replace metals when the latter are used as electrical conductors or semiconductors. The impetus for such replacement includes, among others, lower cost, lower weight of materials, and increased processing variability for polymers as compared with metals. For example, polymers readily can be cast as films, foils, and fibers by standard, time-tested procedures. Polymers can be formed into a limitless variety of shapes and dimensions by standard processing procedures, thereby adding to the potential benefit of electrically conducting polymers.

One potential use for electrically conducting polymers is as electrodes or components of batteries, where their low weight and vast scope of design are attractive. Electrically conducting polymers also could find use in construction of solar cells. Where such polymers are photoconducting they would undoubtedly find applications in the electrophotographic industry.

Among the classes of polymers which hold promise, at least conceptually, as electrical conductors, semiconductors and as photoconductors, are aromatic azopolymers. These polymers are characterized by an extended conjugated system having the azo linkage, —N=N—, as a distinguishing feature in the repeating unit. The invention herein is a method of preparing such polymers simply and in relatively good yield. More specifically, our invention is a method of synthesizing aromatic azopolymers from aromatic diamines using sodium perborate.

Aromatic diamines have been oxidatively coupled to produce mainly dimers using oxygen and cuprous chloride in pyridine. I. L. Kotlyarevski, M. P. Terpugova, and E. K. Andrievskaya, *Chem. Abst.* 62, 6571f (1964). Both the low degree of polymerization and the apparent low product yield militate against this preparative method. Several years later Bach and Black (*J. Polym. Sci.*, Part C, 22, 799 (1969)) improved upon the earlier work by using a pyridine and N,N-dimethylacetamide mixed solvent system. Although the degree of polymerization was substantially improved, polymer yield remained uncertain.

Aromatic monoamines are known to be oxidatively coupled to azo compounds by hydrogen peroxide and other peroxides, such as persulfate. Although sodium perborate seems to be best of the peroxides, (S. M. Mehta and M. V. Vakilwala, *J. Am. Chem. Soc.*, 74, 563 (1952); P. Santurri, F. Robbins, and R. Stubbings, *Org. Syn. Coll. Vol. V,* 341 (1973)) even here product yields of 20–45% are the norm, with reported yields only infrequently approaching 60%.

Since polymer syntheses require a high yield reaction with few, if any, side reactions, it was expected that oxidation of aromatic diamines with perborate would be an unsatisfactory route to aromatic azopolymers. To our surprise and gratification we have found that aromatic azopolymers can be formed in quite good yield, even up to about 97%, by perborate oxidation of aromatic diamines. This unusual result thus affords a relatively facile access to a class of polymers whose electrical conduction and photoconduction merit continued interest.

SUMMARY OF THE INVENTION

The object of this invention is to prepare aromatic azopolymers in good yield. An embodiment comprises oxidizing an aromatic diamine with a perborate. In a more specific embodiment sodium perborate is employed in glacial acetic acid.

DESCRIPTION OF THE INVENTION

The invention described herein is a method of synthesizing aromatic azopolymers comprising oxidizing an aromatic diamine with a perborate under reaction conditions and recovering the aromatic azopolymer produced thereby. That aromatic azopolymers are formed in good yield by the method claimed herein is quite unexpected based upon prior art reports of yields under 60% for products corresponding dimers.

The aromatic diamines that can be employed in the practice of this invention have the formula,

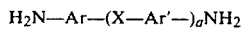

$$H_2N-Ar-(X-Ar'-)_a NH_2$$

In one branch of this invention a is O and Ar is a divalent aromatic or heteroaromatic (i.e., aromatic heterocyclic) nucleus. By a divalent aromatic or heteroaromatic nucleus is meant a divalent species whose parent is an aromatic or heteroaromatic moiety. Examples of such moieties include benzene, naphthalene, anthracene, chrysene, and biphenyl, with benzene being a favored parent. Examples of heteroaromatic moieties which may be the parent of suitable divalent species include pyridine, thiophene, pyrrole, furan, imidazole, oxazole, thiazole, quinoline, carbazole, pyrimidine, purine, and so forth. Pyridine, furan, and thiophene are preferred parents of the divalent heteroaromatic nucleus. The divalent aromatic or heteroaromatic nucleus also may bear one or more substituents which are inert under the reaction conditions, especially where such substituents exert a beneficial effect on some desired property of the resulting polymer.

In a second branch of this invention a is 1. In this branch both Ar and Ar' are divalent aromatic or heteroaromatic nuclei conforming to the description above. Ar and Ar' may be different, although most often they will be identical. In this branch of our invention X may be O, C=O, S, SO, CH$_2$, or SO$_2$. Thus, in this branch of our invention the diamines are substituted diaryl ethers, diaryl ketones, diarylsulfides, diarylsulfoxides, diarylsulfones, and diarylmethanes.

Examples of suitable diamines are cited for illustrative purposes only. Although a particular positional isomer may be specified such specification is not intended to exclude other isomers. Some suitable diamines include 1,4-diaminobenzene, 4,4'-diaminodiphenyl, 1,4-diaminonaphthalene, 1,5-diaminonaphthalene, 2,6-diaminonaphthalene, 9,10-diaminoanthracene, 1,5-diaminoanthracene, 1,4-diaminoanthracene, 2,6-diaminopyridine, 2,5-diaminothiophene, 3,4-diaminothiophene, diaminofuran, diaminopyrrole, 3,7-diaminoquinoline, 2,5-diaminopyrimidine, 2,8-diaminopurine, 4,4'-diaminobenzophenone, 4,4'-diaminodiphenylether, 4,4'-diaminodiphenylsulfide, 4,4'-diaminodiphenylsulfoxide, 4,4'-diaminodiphenylsulfone, 4,4'-diaminodiphenylmethane, and so forth.

The diamine is oxidatively coupled, forming the azo linkage, using a perborate. An alkali metal salt of perborate is generally used, and among these sodium and potassium perborate are favored. At least 1 molar proportion of perborate, based on diamine, is used with an excess of perborate up to about 5 molar proportions being found advantageous.

Acetic acid is a particularly good solvent for the reaction mixture. Other liquid organic acids may be used, but not necessarily with equivalent results. The use of glacial acetic acid often is preferred to promote relatively quick reaction, but where the oxidation is too rapid in glacial acetic acid the use of aqueous acetic acid is recommended. It also is found that, at least in some instances the presence of 1–5 molar proportions of boric acid in the reaction medium improves product yield.

The reaction temperature depends, among other things, on the solvent system employed and the diamine used as reactant. The temperature is not critical per se, so long as the reaction may be controlled. Often it is observed that there is a substantial exotherm during the reaction which may be deleterious in the sense of making control over the reaction quite difficult. Generally a reaction temperature between about 20° and about 70° C. is employed with a range between 30° and 60° C. being preferred.

The reaction is most conveniently performed by mixing the perborate with a diamine for a suitable time and recovering the formed azopolymer which precipitates. For example, a solution of the diamine in glacial acetic acid may be mixed with at least 1 molar proportion of, for example, sodium perborate. Because a molar excess of perborate is desirable an amount up to about 5 molar proportions may be used. The reaction mixture also may contain from about 1 to about 5 molar proportions of boric acid in those cases where its presence improves product yield. The reaction mixture is stirred with heating, where desired, up to a temperature as high as about 70° C. An appreciable exotherm often is observed at the beginning of the oxidation. The temperature may be moderated, where desired, and the reaction may be continued until no further solid is formed. The aromatic azopolymers are collected, as by filtration, then washed with acetic acid and water.

The polymers of this invention have the repeating unit

Although these polymers are insulators, most show an appreciable increase in their conductivity upon doping. By "doping" is meant adding a compound, referred to as a dopant, to the polymer so as to form a redox system where an electron is transferred from the polymer to the dopant, or vice versa. Two common examples of dopants are iodine (an electron acceptor) and sodium naphthalide (an electron donor). When the polymer transfers an electron to the dopant it is called a p-type dopant; conversely, when the polymer accepts an electron from the dopant it is called an n-type dopant.

As examples of p-type dopants there may be cited bromine, chlorine, and iodine; $SbF_5$, $AsF_5$, $PF_5$, and related compounds where fluorine is replaced by a highly electronegative, non-nucleophilic group; $AgClO_4$ as representative of a silver compound with a non-nucleophilic anion; $NO_2Y$ and $NOY$, where Y is a non-nucleophilic anion such as $SbF_6^-$, $BF_4^-$, and so on; and sulfuric and perchloric acids.

Examples of n-type dopants are more limited. The most common of such dopants are alkali metal salts of the radical anions of aromatic systems, as exemplified by sodium naphthalide.

Electrochemical doping introduces additional variants. For example, if the polymer serves as the cathode in a medium containing a tetraalkylammonium perchlorate as the electrolyte, the polymer becomes reduced, thereby exhibiting n-type conduction, and the tetraalkylammonium cation serves as a dopant by impregnating the polymer to preserve electrical neutrality. When the polymer serves as the anode it becomes oxidized and exhibits p-type conduction with the perchlorate anion serving as the dopant.

The amount of dopant incorporated into the polymer to give the electrically conducting system is subject to wide variation depending, for example, on the dopant and the conductivity desired. In the case of iodine, for example, the mole ratio dopant to repeating unit of polymer may be as low as about 0.1 and up to about 5.

The following examples serve only to illustrate this invention and are not intended to limit it thereby.

EXAMPLE 1

All polymers were synthesized by the following general procedure. Into a 100 ml 3-neck flask fitted with a thermometer and mechanical stirrer were placed 8.00 g (0.052 moles) of sodium perborate tetrahydrate, 2.00 g (0.032 moles) of boric acid, 0.019 moles of diamine, and 50 ml of glacial acetic acid. The mixture was heated with stirring to 50° C., when a dark-colored solution generally formed. At this point, an exotherm generally occurred, and was accompanied by the separation of a dark-colored solid. The exotherm seldom exceeded 90° C., and generally lasted only a few minutes. Afterwards the mixture was stirred at 70° C. overnight. The polymers were isolated by filtration, then washed with glacial acetic acid and water before drying under vacuum.

Melting points were determined in standard closed-end capillaries. Viscosities were determined using a Cannon-Fenske No. 200 viscometer at polymer concentrations of 0.5 g/dl in concentrated sulfuric acid at 30° C. For comparison the viscosity as reported by H. C. Bach and W. B. Black, *J. Polym. Sci.*, Part C, 22, 799 (1969) is also listed. Results are summarized in the following Table 1.

TABLE 1

| Aromatic Azopolymer Synthetic Data | | | | |
|---|---|---|---|---|
| | | | Inherent Viscosity | |
| Monomer | Yield % | M.P., °C. | Experimental | Literature |
| 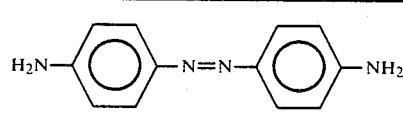 | 84 | >360 | 0.16 | — |

TABLE 1-continued

Aromatic Azopolymer Synthetic Data

| Monomer | Yield % | M.P., °C. | Inherent Viscosity Experimental | Inherent Viscosity Literature |
|---|---|---|---|---|
| $H_2N-\text{C}_6H_4-NH_2$ | 73 | >360 | 0.49 | 0.41 |
| $H_2N-C_6H_4-SO_2-C_6H_4-NH_2$ | 85 | 220–250 (DEC) | 0.07 | 0.11 |
| $H_2N-C_6H_4-C_6H_4-NH_2$ | 97 | 300 (DEC) | 0.26 | — |
| $H_2N-C_6H_4-CH_2-C_6H_4-NH_2$ | 55 | >360 | 0.30 | 0.55 |
| $H_2N-C_6H_4-O-C_6H_4-NH_2$ | 84 | >360 | 0.19 | 1.1 |
| $H_2N-\text{pyridine}-NH_2$ | 70 | >360 | 0.15 | 0.09 |

EXAMPLE 2

Pellets for electrical conductivity testing were prepared by adding a measured amount of the polymer powder to a Beckman IR pellet press. The pellets were 1.3 cm in diameter with the thickness determined by the amount of material pressed and the pressure used.

To obtain reliable conductivity data which could be duplicated it was found necessary to dry the material thoroughly in vacuum. Accordingly, after being pressed all pellets were dried at 100° C. at 0.2 mm Hg for several hours. Pellets normally were removed and stored under nitrogen until testing.

Iodine doping was carried out by adding an iodine crystal to a chamber containing a pellet of polymer. The chamber then was evacuated causing immediate sublimation of iodine. Gaseous iodine remained in contact with a pellet for a period from about 1.5 to about 17 hours, whereupon the doped pellet was removed and stored under nitrogen until being tested.

Conductivity results are summarized in Table 2. As can be readily seen, some of the iodine-doped polymers exhibit a conductivity which may be characterized as being in the semiconductor range.

TABLE 2

Conductivity Data For Aromatic Azopolymers

| Monomer Precursor | Iodine-Doped Polymer Conductivity (ohm$^{-1}$-cm$^{-1}$) | Molar Ratio of Iodine to Polymer Unit |
|---|---|---|
| $H_2N-C_6H_4-N=N-C_6H_4-NH_2$ | $5.3 \times 10^{-9}$ | 0.43 |
| $H_2N-C_6H_4-NH_2$ | $8.3 \times 10^{-7}$ | 0.53 |
| $H_2N-C_6H_4-C_6H_4-NH_2$ | $1.59 \times 10^{-11}$ | 0.12 |
| $H_2N-C_6H_4-CH_2-C_6H_4-NH_2$ | $2.56 \times 10^{-6}$ | 0.68 |

What is claimed is:

1. A method of preparing an electrically conducting polymeric composition comprising adding to a polymer whose repeating unit has the structure —Ar—(X—Ar')$_a$—N=N— where Ar and Ar' are independently selected from the group consisting of divalent aromatic nuclei whose parent is benzene, biphenyl, naphthalene, anthracene, chrysene, pyridine, thiophene, pyrrole, furan, imidazole, oxazole, quinoline, carbazole, pyrimidine, or purine, X is O, C=O, S, SO, SO$_2$, or CH$_2$, and a is 0 or 1, an effective amount, sufficient to increase electrical conductivity, of a dopant and recovering the resulting doped polymer.

2. The method of claim 1 where the dopant is an n-type dopant.

3. The method of claim 2 where the dopant is an alkali metal salt of an aromatic radical anion.

4. The method of claim 1 where the dopant is a p-type dopant.

5. The method of claim 1 where the doped polymer is electrochemically doped.

6. The method of claim 4 where the dopant is selected from the group consisting of chlorine, bromine, iodine, $SbS_5$, $AsF_5$, $PF_5$, $AgY$, $NO_2Y$, and $NOY$ where Y is an unreactive non-nucleophilic anion.

7. The method of claim 1 where an effective amount is a mole ratio of dopant to polymer from about 0.1 up to about 5.

8. An electrically conducting polymer composition comprising a polymer whose repeating unit has the structure

where Ar and Ar' are independently selected from the group consisting of divalent aromatic nuclei whose parent is benzene, biphenyl, naphthalene, anthracene, chrysene, pyridine, thiophene, pyrrole, furan, imidazole, oxazole, quinoline, carbazole, pyrimidine, or purine, and X is O, C=O, S, SO, $SO_2$, or $CH_2$, and a is 0 or 1, and an effective amount, sufficient to increase electrical conductivity, of a dopant.

9. The composition of claim 8 where the dopant is an n-type dopant.

10. The composition of claim 9 where the dopant is an alkali metal salt of an aromatic radical anion.

11. The composition of claim 8 where the dopant is a p-type dopant.

12. The composition of claim 11 where the dopant is a quaternary ammonium salt of an unreactive non-nucleophilic anion.

13. The composition of claim 11 where the dopant is selected from the group consisting of chlorine, bromine, iodine, $SbF_5$, $AsF_5$, $PF_5$, $AgY$, $NO_2Y$, and $NOY$ where Y is an unreactive, non-nucleophilic anion.

14. The composition of claim 8 where an effective amount is a mole ratio of dopant to polymer from about 0.1 up to about 5.

* * * * *